(12) United States Patent
Chen et al.

(10) Patent No.: US 11,444,450 B2
(45) Date of Patent: Sep. 13, 2022

(54) ADAPTIVE FAULT CLEARING SCHEME FOR MMC VSC-HVDC GRID BASED ON SOURCE-GRID COORDINATION

(71) Applicant: Tianjin University, Tianjin (CN)

(72) Inventors: Xiaolong Chen, Tianjin (CN); Xiaowen Han, Zhangye (CN); Yongli Li, Tianjin (CN); Bin Li, Tianjin (CN); Botong Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/360,152

(22) Filed: Jun. 28, 2021

(65) Prior Publication Data
US 2022/0224100 A1 Jul. 14, 2022

(30) Foreign Application Priority Data
Jan. 12, 2021 (CN) .......................... 2021100388411

(51) Int. Cl.
*H02H 3/06* (2006.01)
*H02H 3/093* (2006.01)
*H02H 7/26* (2006.01)

(52) U.S. Cl.
CPC .............. *H02H 7/26* (2013.01); *H02H 3/066* (2013.01); *H02H 3/0935* (2013.01)

(58) Field of Classification Search
CPC ......... H02H 7/26; H02H 3/066; H02H 3/0935
See application file for complete search history.

(56) References Cited

U.S. PATENT DOCUMENTS

| 2018/0241202 A1* | 8/2018 | Mokhberdoran | ...... H02H 3/087 |
| 2021/0057911 A1* | 2/2021 | Pieschel | ................ H02J 3/1814 |
| 2022/0094260 A1* | 3/2022 | Deng | .................. H02M 1/0095 |

FOREIGN PATENT DOCUMENTS

| CN | 104767171 A | * | 7/2015 | |
| CN | 106711931 A | * | 5/2017 | ............. H02H 3/087 |
| CN | 108649544 A | * | 10/2018 | ............. H02H 7/268 |
| CN | 110265982 A | * | 9/2019 | |
| CN | 110492499 A | * | 11/2019 | |
| CN | 109412127 B | * | 1/2020 | ............. H02H 7/262 |
| CN | 110970875 A | * | 4/2020 | |
| CN | 112202179 A | * | 1/2021 | |
| CN | 113346780 A | * | 9/2021 | |
| CN | 113452276 A | * | 9/2021 | |
| CN | 113765122 A | * | 12/2021 | |

(Continued)

*Primary Examiner* — Sisay G Tiku
(74) *Attorney, Agent, or Firm* — Andrew C. Cheng

(57) ABSTRACT

The invention discloses an adaptive fault clearing scheme for an MMC VSC-HVDC grid based on source-grid coordination. A grid-side circuit breaker topology is disposed at each end of each DC line of the MMC VSC-HVDC grid to coordinate with a source-side control strategy when a fault occurs to the DC line so as to isolate the fault together. When a system runs stably, the voltage regulation controller does not actuate, after the fault occurs, the voltage regulation controller is started, and the output voltage regulation coefficient decreases, so that voltage at outlets of the converters drops accordingly, and coordinates with voltage of the pre-charging capacitor of the grid-side circuit breaker topology to realize fault isolation based on source-grid coordination. The adaptive fault clearing scheme provided by the invention greatly improves the speed of fault isolation.

4 Claims, 4 Drawing Sheets

MMC voltage regulation control principle

Grid-side circuit breaker topology

(56) References Cited

FOREIGN PATENT DOCUMENTS

| CN | 113991662 A | * | 1/2022 | |
|---|---|---|---|---|
| CN | 111142044 B | * | 3/2022 | |
| CN | 114221370 A | * | 3/2022 | |
| GB | 2519791 A | * | 5/2015 | ............ H02H 3/087 |
| WO | WO-2017025927 A1 | * | 2/2017 | ............ H02H 3/087 |
| WO | WO-2019227995 A1 | * | 12/2019 | ............ H02H 7/268 |

* cited by examiner

ADAPTIVE FAULT CLEARING SCHEME FOR MMC VSC-HVDC GRID BASED ON SOURCE-GRID COORDINATION

CROSS REFERENCE TO RELATED APPLICATION

The invention relates to the technical field of VSC-HVDC grid protection and control, in particular to an adaptive fault clearing scheme for an MMC VSC-HVDC grid based on source-grid coordination.

BACKGROUND OF THE INVENTION

As a new generation of power transmission technology, voltage source converter based high voltage direct current transmission (VSC-HVDC) has the advantages of independent control of active power and reactive power, no DC filter and no commutation failure, is available for grid interconnection and large-scale transmission of renewable energy, and is one of the important directions of grid development and reform in the future. The emergence of modular multi-level converters (MMCs) allows VSC-HVDC to develop towards high voltage and high capacity. MMC has become the preferred converter topology for VSC-HVDC systems and has been widely used worldwide.

In long-distance DC transmission projects, overhead lines are the main transmission mode. However, overhead lines are exposed to the external environment and have a high risk of failure. When faults occur in DC grids, the fault current rises rapidly. Due to weak damping properties of DC grids and low tolerance limit of fully-controlled devices, the ability to withstand DC faults is poor. Therefore, the DC grids are required to cut off fault lines quickly within a few milliseconds, thus avoiding harm from the fault current to equipment throughout the grids and ensuring safe and reliable operation of the DC grids.

Fault clearing schemes for DC grids can be divided into source-side schemes and grid-side schemes. With DC buses as boundaries, if a fault clearing scheme requires the coordination of converters and affects external power transmission of converter stations for a short time, the fault clearing scheme can be called a source-side clearing scheme; if a fault clearing scheme only isolates fault lines and does not affect the power transmission of non-fault lines, the fault clearing scheme can be called a grid-side clearing scheme. In the source-side scheme, the fault current is suppressed or turned off by lowering source-side voltage or providing source-side reverse voltage, while in the grid-side scheme, the fault current is suppressed or turned off by increasing line impedance or lowering line voltage.

High controllability of converter stations is utilized in the source-side scheme, but power transmission of converter stations at near-ends of fault lines will be blocked by controlling the fault current through the converter stations during fault clearing, bringing adverse effect to the selectivity. DC circuit breakers are used to clear faults with absolute selectivity in the grid-side scheme, but it is still difficult to develop high-speed DC circuit breakers with high switching capacity due to high costs and difficulties in coordination and control.

SUMMARY OF THE INVENTION

In order to solve technical defects in the prior art, the purpose of the invention is to provide an adaptive fault clearing scheme for an MMC VSC-HVDC grid based on source-grid coordination to achieve fault clearing through source-grid coordination based on a source-side control strategy and a grid-side circuit breaker topology. During a DC fault, the number of sub-modules for the converters is reduced by the control strategy, so that DC voltage at outlets of the converters drops, and adaptively coordinates with voltage of the grid-side pre-charging capacitor to clear the fault.

The purpose is achieved by the following technical solution:

An adaptive fault clearing scheme for an MMC VSC-HVDC grid based on source-grid coordination, wherein the MMC VSC-HVDC grid comprises two source-side converter stations MMC1 and MMC3, two grid-side converter stations MMC2 and MMC4, wherein converters of the four converter stations are connected in a square shape by double-circuit DC overhead lines, and each converter station is equipped with two converters; a grid-side circuit breaker is disposed at each end of each DC line connected with the converters to coordinate with a source-side control strategy when a fault occurs to the DC line so as to isolate the fault together; the grid-side circuit breaker topology comprises:

a steady-state low-loss branch, comprising a disconnector $UFD_1$, an IGBT device and a disconnector $UFD_2$ sequentially connected in series;

a transfer branch, comprising a transistor $T_0$ disposed in parallel, wherein one end of the transistor $T_0$ is connected with the front end of the disconnector $UFD_1$, and the other end is connected to a line between the IGBT device and the disconnector $UFD_2$;

a charging circuit, disposed at the rear ends of the steady-state low-loss branch and the transfer branch and formed by sequentially connecting a pre-charging capacitor C, a switch RCB, a charging resistor $R_C$ and a charging inductor $L_C$ in series; wherein one end of the pre-charging capacitor C is connected with the rear end of the disconnector $UFD_2$, and one end of the charging inductor $L_C$ is grounded;

a discharging branch, comprising a transistor $T_1$ connected in parallel with the charging circuit, wherein one end of the transistor $T_1$ is connected to a ground terminal of the charging inductor $L_C$, and the other end is connected to a line between the pre-charging capacitor C and the switch RCB; and a flyback energy dissipation branch, connected in parallel with the charging circuit and disposed at the rear ends of the charging circuit and the discharging circuit, and comprising a flyback diode D and an energy dissipation resistor $R_e$ connected in series; wherein the other end of the energy dissipation resistor $R_e$ is grounded, and the other end of the flyback diode D is connected with the rear end of the disconnector $UFD_2$ and the front end of a current limiting inductor $L_{dc}$ disposed at a terminal;

wherein the source-side control strategy is realized by a voltage regulation controller; when a system runs stably, the voltage regulation controller does not actuate, and the output voltage regulation coefficient K is kept at 1; after a fault occurs, the voltage regulation controller is started, and the output voltage regulation coefficient K decreases within the range of [0,1], so that voltage at outlets of the converters drops accordingly, and coordinates with voltage of the pre-charging capacitor of the grid-side circuit breaker topology to realize fault isolation based on source-grid coordination;

wherein the voltage regulation controller gives corresponding voltage regulation coefficients K at different stages after the fault occurs, and the voltage regulation controller comprises a preliminary current limiting link and an adaptive voltage regulation link; the preliminary current limiting link is put into operation until the system detects the fault, while the adaptive voltage regulation link is put into operation only after the system detects the fault; after the fault occurs, the preliminary current limiting link is started immediately to preliminarily limit the development of fault current; after monitoring the fault, a DC grid protection system switches to the adaptive voltage regulation link, and adaptively coordinates with voltage of the grid-side pre-charging capacitor to isolate the fault together.

The pre-charging capacitor needs to be charged during normal operation of the DC grid, so that the pre-charging capacitor has a rated DC voltage after charging to lower the output voltage by adjusting the number of sub-modules of the converters in the fault isolation stage, and coordinate with voltage of the pre-charging capacitor to decrease and turn off the fault current.

The voltage attenuation speed of the pre-charging capacitor is different at different transition resistance when a fault occurs to the DC grid, and the voltage regulation coefficient K is matched with different transition resistance to adaptively adjust the number of removed sub-modules to cope with both metallic short-circuit faults and high-resistance short-circuit faults.

The pre-charging capacitor C needs to be charged during normal operation of the DC grid, so that the pre-charging capacitor C has a rated DC voltage after charging to lower the output voltage by adjusting the number of sub-modules for the converters in the fault isolation stage, and coordinate with voltage of the pre-charging capacitor C to decrease and turn off the fault current. The voltage attenuation speed of the pre-charging capacitor C is different at different transition resistance when a fault occurs to the DC grid, and the voltage regulation coefficient K is matched with different transition resistance to adaptively adjust the number of removed sub-modules to cope with both metallic short-circuit faults and high-resistance short-circuit faults.

When a fault occurs to the DC grid, fault clearing is achieved by the following steps:

at time $t_0$, the fault occurs, and fault current flows from the converter stations to a fault point through the steady-state low-loss branch, in the meantime, the preliminary current limiting link is started immediately to preliminarily limit the rise of the fault current, and an instruction is given to block the IGBT device and turn on the thyristor $T_0$ to allow the fault current on the steady-state low-loss branch to be quickly transferred to the transfer branch; and the disconnector $UFD_1$ is turned off when the current flowing through the disconnector $UFD_1$ drops to 0;

at time $t_1$, the fault is detected, the disconnector $UFD_1$ is turned off, and the thyristor $T_1$ is turned on, the pre-charging capacitor C is connected to the fault current circuit, and the number of control sub-modules of the source-side converters is reduced, so that the sum of voltage of sub-modules for upper and lower bridge arms of the converters is less than the voltage $u_{Cfit}$ of the pre-charging capacitor; in the process, the fault current in the transfer branch drops to zero at a large rate to turn off the thyristor $T_0$, and the fault point is isolated after the thyristor $T_0$ is turned off;

at time $t_2$, the thyristor $T_0$ is turned off, energy of the pre-charging capacitor C is transferred to the current limiting inductor $L_{dc}$, and the disconnector $UFD_2$ is turned off to isolate the fault line; after the fault is isolated, the MMC switches from an adaptive voltage regulation control mode to a conventional control mode to restore normal operation of the DC grid;

at time $t_3$, the pre-charging capacitor C is reversely charged, and the current $i_C$ of the charging circuit and the current $i_L$ of the current limiting inductor $L_{dc}$ start to decrease, in the meantime, the diode D in the flyback energy dissipation branch is turned on, the current $i_D$ of the diode D starts to rise from zero, energy of the current limiting inductor $L_{dc}$ is released to the flyback energy dissipation branch, and the pre-charging capacitor C is reversely charged;

at time $t_4$, the current $i_C$ of the charging circuit drops to zero, the thyristor $T_1$ is turned off, and the current $i_D$ of the diode D reaches the maximum value and starts to decrease; and residual energy of the current limiting inductor $L_{dc}$ is gradually released to the flyback energy dissipation branch; and at time $t_5$, energy dissipation is over and the fault clearing is completed. Compared with the prior art, the invention has the following positive effects:

Firstly, decoupling of fault isolation and fault energy dissipation is realized, with energy dissipation after isolation, fast isolation and slow energy dissipation, thereby greatly improving the speed of fault isolation, so the adaptive fault clearing scheme is applicable to some working conditions with requirement for rapidity, and has some engineering guiding significance.

Secondly, the grid-side pre-charging capacitor can suppress the fault current and reduce the energy release speed of sub-module capacitors of the MMC, thereby preventing the MMC from failing to fully restore DC voltage immediately after the fault is cleared due to deep discharge, and enhancing the fault ride-through capability of the DC grid.

In addition, the peak value of fault current during a fault is reduced by voltage regulation control, reducing the risk of converter blocking due to overcurrent.

Finally, the voltage attenuation speed of the pre-charging capacitor is different at different transition resistance, and the voltage regulation coefficient can be matched with different transition resistance to adaptively adjust the number of removed sub-modules to cope with both metallic short-circuit faults and high-resistance short-circuit faults.

DETAILED DESCRIPTION OF THE PREFERRED EMBODIMENTS

The invention will be further described in detail with reference to accompanying drawings and embodiments. It should be understood that various embodiments described herein are only intended to explain the invention and not to limit the invention.

According to the adaptive fault clearing scheme for an MMC VSC-HVDC grid based on source-grid coordination, the number of sub-modules for the MMC is reduced through a control strategy during a DC fault, so that DC voltage at outlets of the converters drops, and adaptively coordinates with voltage of the grid-side pre-charging capacitor to turn off the fault current and clear the fault.

Figure 1:
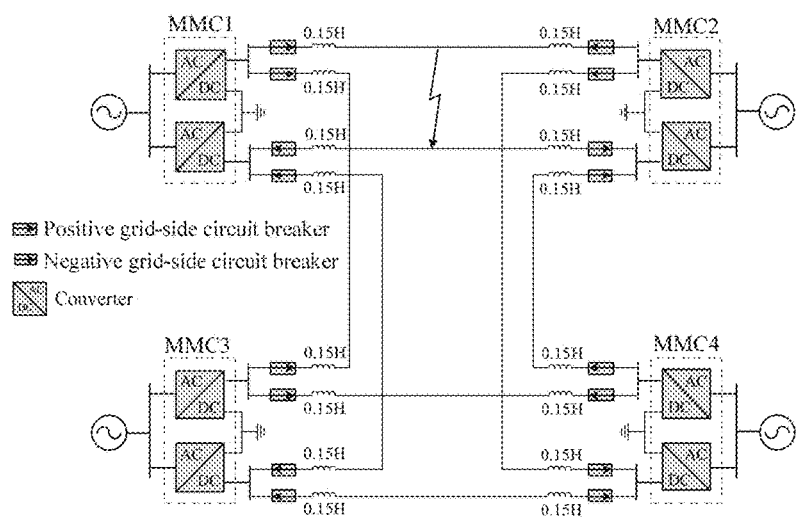
FIG. 1 shows a topology of a ±500 kV four-terminal MMC DC grid system.
Figure 2:
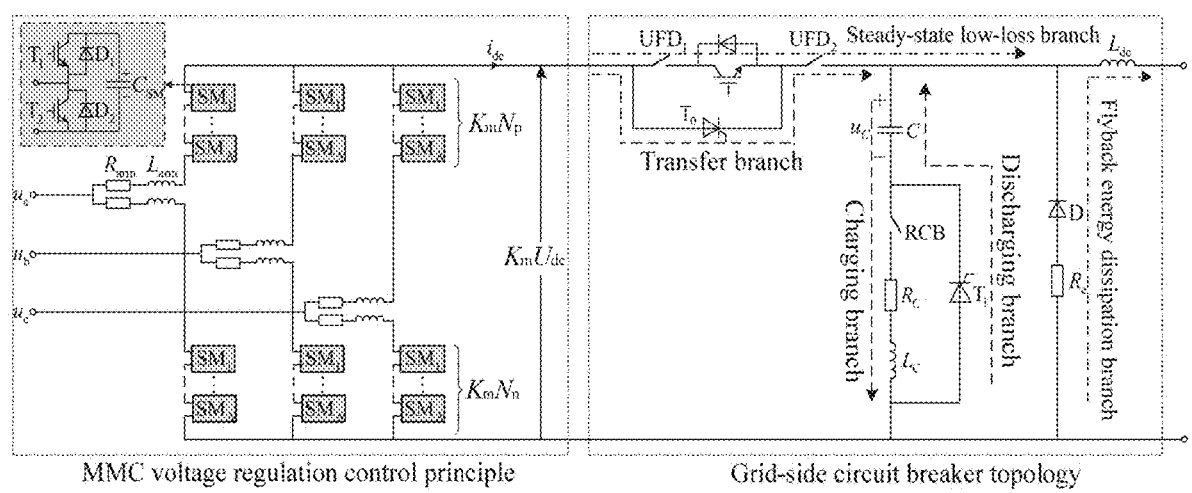
FIG. 2 shows the implementation of adaptive fault clearing based on source-grid coordination and a grid-side circuit breaker topology.

FIG. 1 shows a topology of a ±500 kV four-terminal MMC DC grid system. A grid-side circuit breaker is disposed on each DC line, as shown in FIG. 2. The grid-side circuit breaker topology shown in FIG. 2 is used to coordinate with the source-side control strategy to clear a fault occurring to the DC line. The grid-side circuit breaker topology can be divided into 5 branches, i.e., a steady-state low-loss branch, a transfer branch, a charging branch, a discharging branch and an energy dissipation branch; wherein the steady-state low-loss branch comprises a disconnector $UFD_1$, an IGBT device and a disconnector $UFD_2$ sequentially connected in series; the transfer branch comprises a transistor $T_0$ disposed in parallel, wherein one end of the transistor $T_0$ is connected with the front end of the disconnector $UFD_1$, and the other end is connected to a line between the IGBT device and the disconnector $UFD_2$; the charging circuit is disposed at the rear ends of the steady-state low-loss branch and the transfer branch and formed by sequentially connecting a pre-charging capacitor C, a switch RCB, a charging resistor $R_C$ and a charging inductor $L_C$ in series; wherein one end of the pre-charging capacitor C is connected with the rear end of the disconnector $UFD_2$, and one end of the charging inductor $L_C$ is grounded; the discharging branch comprises a transistor $T_1$ connected in parallel with the charging circuit, wherein one end of the transistor $T_1$ is connected to a ground terminal of the charging inductor $L_C$, and the other end is connected to a line between the pre-charging capacitor C and the switch RCB; and the flyback energy dissipation branch is connected in parallel with the charging circuit and disposed at the rear ends of the charging circuit and the discharging circuit, and comprises a flyback diode D and an energy dissipation resistor $R_e$ connected in series; wherein the other end of the energy dissipation resistor $R_e$ is grounded, and the other end of the flyback diode D is connected with the rear end of the disconnector $UFD_2$ and the front end of a current limiting inductor $L_{dc}$ disposed at a terminal.

Due to constrains of voltage resistance and current limitation on power electronic devices, a plurality of thyristors and diodes need to be connected in series or in parallel when a power electronic device does not meet the requirements. Therefore, in the technical solution, the transistor $T_0$ can be a transistor or the transfer branch formed by connecting more than one transistor in series or in parallel, the transistor $T_1$ can be a transistor or the discharging branch formed by connecting more than one transistor in series or in parallel, and the flyback diode D can be a flyback diode or the flyback energy dissipation branch formed by connecting more than one flyback diodes in series or in parallel, as the case may be.

As shown in FIG. 2, the grid-side circuit breaker topology has an input side connected to a voltage output side of an MMC voltage regulation controller with an output current $i_{dc}$, an output voltage $KU_{dc}$, and three phases $U_a$, $U_b$ and $U_c$. Each phase comprises an upper bridge arm and a lower bridge arm, both the upper bridge arm and the lower bridge arm comprise KN identical sub-modules $SM_{1-N}$ and bridge arm inductors $L_{arm}$ connected in series. Bridge arm resistors $R_{arm}$, bridge arm inductors $L_{arm}$ and bridge arm resistors $R_{arm}$ are connected in series with N identical sub-modules $SM_{1-N}$. Connecting points of the bridge arm resistors $R_{arm}$ of the upper and lower bridge arms of each phase are connected with the three phases $U_a$, $U_b$ and $U_c$, wherein each sub-module comprises a capacitor $C_{SM}$, two high-power controllable electronic power switches T1 and T2, and two diodes D1 and D2. As shown in FIG. 2, the switches T1 and T2 are inversely connected in parallel with the diodes D1 and D2 respectively, then connected in series, and connected in parallel with the capacitor $C_{SM}$.

The voltage regulation control strategy for converters in different fault stages is given, then the working principle of the MMC DC grid line from fault occurrence to fault clearing is analyzed, and finally the design method of component parameters is given.

By multiplying the number of sub-modules for bridge arm units output by the MMC voltage regulation controller by the voltage regulation coefficient K, the DC voltage at outlets of DC sides of the converters can be K times the rated DC voltage, where the voltage regulation coefficient K is given by the voltage regulation controller, with an operating range of [0,1]. Therefore, in the invention, the following source-side control strategy is given by the MMC voltage regulation controller:

When the system runs stably, the voltage regulation controller does not actuate, and the voltage regulation coefficient K is kept at 1; after a fault occurs, the voltage regulation controller is started, and the voltage regulation coefficient K decreases, so that voltage at outlets of the converters drops accordingly, and coordinates with voltage of the grid-side pre-charging capacitor C to turn off the fault current.

In the invention, the pre-charging capacitor C needs to be charged during normal operation of the DC grid, so that the pre-charging capacitor C has a rated DC voltage after charging to coordinate with the voltage of the pre-charging capacitor in the fault clearing stage, and apply a reverse voltage to the bridge arm inductor to decrease and turn off the fault current.

In the invention, the voltage attenuation speed of the pre-charging capacitor C is different at different transition resistance during a fault, and the voltage regulation coefficient K is matched with different transition resistance to adaptively adjust the number of removed sub-modules to cope with both metallic short-circuit faults and high-resistance short-circuit faults.

Figure 3:
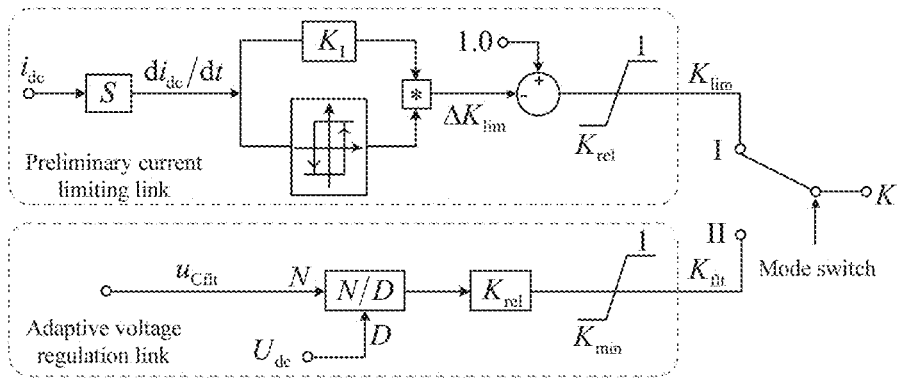
FIG. 3 shows control modes of a preliminary current limiting link and an adaptive voltage regulation link.

Furthermore, in order to realize the voltage regulation control, the invention further provides a voltage regulation controller for realizing the functions. The voltage regulation controller can give corresponding voltage regulation coefficients at different stages after a fault occurs. Specifically, as shown in FIG. 3, the voltage regulation controller comprises two additional control links on the basis of a conventional half-bridge MMC voltage regulation controller, i.e., a preliminary current limiting link and an adaptive voltage regulation link. The preliminary current limiting link is put into operation until the system detects the fault, while the adaptive voltage regulation link is put into operation only after the system detects the fault. After the fault occurs, the preliminary current limiting link works immediately to preliminarily limit the development of fault current; after monitoring the fault, a DC grid protection system switches to the adaptive voltage regulation link, and adaptively coordinates with voltage of the grid-side pre-charging capacitor to clear the fault together.

1) Preliminary Current Limiting Link

The link is put into operation only when a fault is suspected on the line, and the principle is as follows:

The DC-side outlet current $i_{dc}$ of the MMC passes through a differentiation element S to get a DC change rate $di_{dc}/dt$, the $di_{dc}/dt$ passes through a hysteresis comparator to get an actuating signal, then the $di_{dc}/dt$ is multiplied by a differential coefficient $K_1$ and the actuating signal to get $\Delta K_{lim}$, and finally the $\Delta K_{lim}$ is subtracted from the upper limit 1 and passes through a 0-1 limiter to get an output $K_{lim}$ of the preliminary current limiting link, and the $K_{lim}$ is used as the voltage regulation coefficient of the preliminary current limiting link. The hysteresis comparator outputs 1 when the input is greater than the action value and outputs 0 when the input is less than the returned value. When the hysteresis comparator outputs 1, the preliminary current limiting link is started to limit the current, and when the hysteresis comparator outputs 0, the preliminary current limiting link is not started.

During normal operation of the system, the DC line current remains basically constant, and the change rate of the DC current does not exceed the action value of the hysteresis comparator under non-fault disturbance, so the voltage regulation coefficient K=1, and the preliminary current limiting link does not affect the normal operation of the converters. The DC line current rises immediately after a fault occurs, and the voltage regulation coefficient K decreases, so that the DC-side outlet voltage of the converters drops accordingly, preliminarily suppressing the development of the fault current.

2) Adaptive Voltage Regulation Link

In the link, the voltage $u_{Cflt}$ of the grid-side pre-charging capacitor of the fault line is selected as a control signal, and the control signal is divided by the rated voltage $U_{dc}$ of the DC system, then multiplied by a reliability coefficient $K_{rel}$, and subjected to a 0-1 limiting link to obtain an output $K_{flt}$ of the link. With the $K_{flt}$ as the voltage regulation coefficient K, the sum of voltage of sub-modules for MMC bridge arm units is less than $u_{Cflt}$. Since the voltage regulation coefficient K is adaptive to changes in the $u_{Cflt}$, the fault current decreases and is turned off at a large rate.

Figure 4:
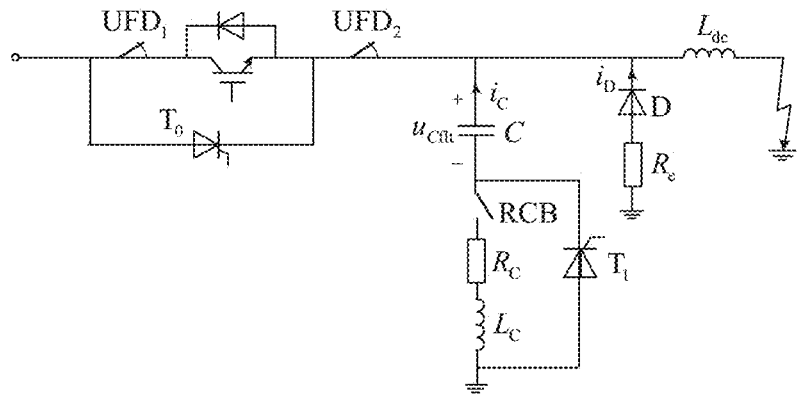
FIG. 4 shows a grid-side circuit breaker topology.

As shown in FIG. 4, the working principle of the fault clearing scheme is described below in three stages.

1) Charging Stage

At the start of charging, the switch RCB is switched on to connect the charging resistor $R_C$ and the charging inductor $L_C$ to the charging circuit, then the DC line starts to charge the pre-charging capacitor C. When the capacitor voltage rises to the rated DC voltage, the charging current is zero, then the switch RCB is switched off to isolate the charging branch, and the charging process is finished.

The charging resistor and the charging inductor are configured to suppress the charging speed of the pre-charging capacitor and avoid great impact on the DC system.

The charging process is calculated analytically. Assuming that the DC voltage of the MMC is $U_{dc}$, the voltage of the pre-charging capacitor C is $u_C$, and the current of the charging circuit is $i_C$, then:

$$\begin{cases} U_{dc} - u_c - L_c \dfrac{di_C}{dt} - R_C i_C = 0 \\ C \dfrac{du_C}{dt} = i_C \end{cases} \quad (1)$$

the solution is:

$$i_C = D_1 e^{\alpha t} \cos(\beta t) + D_2 e^{\alpha t} \sin(\beta t) \quad (2)$$

where:

$$\begin{cases} D_1 = i_C(0_-), \quad D_2 = \dfrac{2U_{dc} - R_C i_C(0_-)}{2\beta L_C} \\ \alpha = -\dfrac{R_C}{2L_C}, \quad \beta = \dfrac{\sqrt{R_C^2 - \dfrac{4L_C}{C}}}{2L_C} \end{cases} \quad (3)$$

It can be seen from equations (2) and (3) that the magnitude of the charging current $i_C$ is influenced by the charging resistor and the charging inductor.

2) Fault Isolation Stage

The fault isolation stage refers to the whole process from fault occurrence to isolation, and the specific process is described as follows:

① At time $t_0$, a fault occurs, and fault current flows from the converter stations to a fault point through the low-loss branch, in the meantime, the preliminary current limiting link is started immediately to preliminarily limit the rise of the fault current, and an instruction is given to block the IGBT device and turn on the thyristor $T_0$ to allow the fault current on the steady-state low-loss branch to be quickly transferred to the transfer branch; and the disconnector $UFD_1$ can be turned off when the current flowing through the disconnector $UFD_1$ drops to 0.

Figure 5:
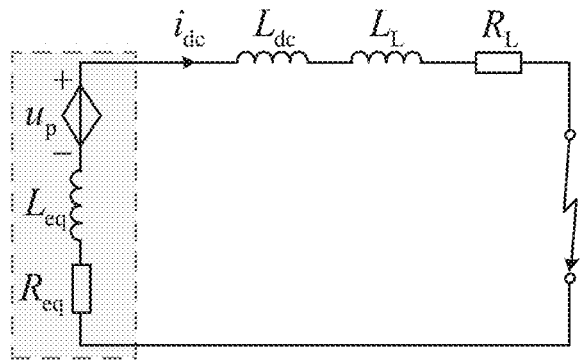
FIG. 5 shows a fault equivalent circuit in a preliminary current limiting stage.

FIG. 5 shows an equivalent circuit at the preliminary current limiting stage in case of a fault, $R_{eq}$ and $L_{eq}$ are equivalent resistance and equivalent inductance of the converter station, where $R_{eq}=2R_{arm}/3$ and $L_{eq}=2L_{arm}/3$, $L_{dc}$ is the current limiting inductor disposed on the line, and $R_L$ and $L_L$ are equivalent resistance and equivalent inductance of the DC line between the fault point and the current limiting inductor, respectively.

With preliminary current limiting control, the voltage of each bridge arm needs to be multiplied by the voltage regulation coefficient K, so the sum of voltage of the sub-modules for the bridge arm units is:

$$u_p = K U_{dc} \quad (4)$$

The fault current in the preliminary current limiting stage during $t_0$-$t_1$ is theoretically calculated. When the preliminary current limiting as shown in FIG. 3 is adopted, the voltage regulation coefficient is:

$$K = 1 - K_I \frac{di_{dc}}{dt} \quad (5)$$

Assuming $L = L_{eq} + L_{dc} + L_L$ and $R = R_{eq} + R_L$, and the initial condition is $i_{dc}(t_0) = I_{dc}$, an equation can be obtained from FIG. 7:

$$\frac{di_{dc}}{dt} + \frac{R}{L + K_I U_{dc}} i_{dc} = \frac{U_{dc}}{L + K_I U_{dc}} \quad (6)$$

the solution is:

$$i_{dc} = \left(I_{dc} - \frac{U_{dc}}{R}\right) e^{-\frac{t}{\tau_{dif}}} + \frac{U_{dc}}{R} \quad (7)$$

where, $\tau_{dif} = (L + K_I U_{dc})/R$ is the time constant under preliminary current limiting. At time $t_1$, assuming $i_{dc}(t_1) = I_1$.

② At time $t_1$, the fault is detected, the disconnector $UFD_1$ is turned off, and the thyristor $T_1$ is turned on, the pre-charging capacitor is connected to the fault current circuit, and the number of control sub-modules of the source-side converters is reduced, so that the sum of voltage of sub-modules for upper and lower bridge arms of the converters is less than the voltage $u_{Cflt}$ of the pre-charging capacitor;

in the process, the fault current in the transfer branch drops to zero at a large rate to turn off the thyristor $T_0$, and the fault point is isolated after the thyristor $T_0$ is turned off. The converters then immediately switch from voltage regulation control to a conventional control mode, allowing the DC grid to restore normal operation.

Figure 6:
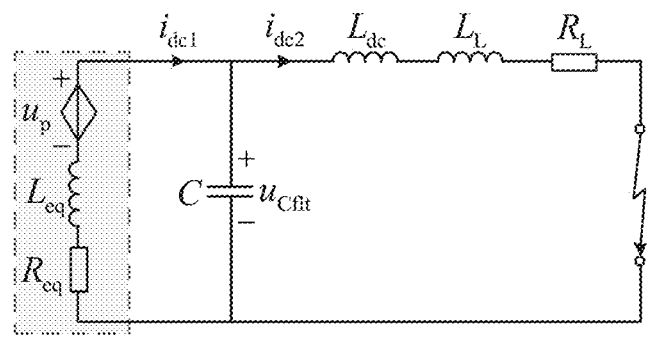
FIG. 6 shows a fault equivalent circuit in an adaptive voltage regulation stage.

FIG. 6 shows an equivalent circuit in the fault isolation stage. When the converters use the adaptive voltage regulation link as shown in FIG. 3, the voltage regulation coefficient K satisfies the following equation:

$$K = K_{rel}\frac{u_{Cflt}}{U_{dc}} \quad (8)$$

Based on equation (8), the sum of voltage of the sub-modules for the bridge arm units is:

$$u_p = K_m U_{dc} = K_{rel} u_{Cflt} \quad (9)$$

The fault current and capacitor voltage in the source-grid coordination stage during $t_1$-$t_2$ are calculated theoretically, and the initial conditions are $i_{dc1}(t_1) = i_{dc2}(t_1) = I_1$, $u_{Cflt}(t_1) = U_{dc}$, then the following equation can be obtained from FIG. 8:

$$\begin{pmatrix} \frac{du_{Cflt}}{dt} \\ \frac{di_{dc1}}{dt} \\ \frac{di_{dc2}}{dt} \end{pmatrix} = \begin{pmatrix} 0 & \frac{1}{C} & -\frac{1}{C} \\ \frac{K_{rel}-1}{L_{eq}} & -\frac{R_{eq}}{L_{eq}} & 0 \\ \frac{1}{L_{dc}+L_L} & 0 & -\frac{R_L}{L_{dc}+L_L} \end{pmatrix} \begin{pmatrix} u_{Cflt} \\ i_{dc1} \\ i_{dc2} \end{pmatrix} \quad (10)$$

It is difficult to get the analytical solution of equation (10) directly, but numerical solutions of $u_{Cflt}$, $i_{dc1}$ and $i_{dc2}$ can be found by the Runge-Kutta method.

According to the numerical solution of equation (10), the fault current $i_{dc1}$ is affected by the voltage $u_{Cflt}$ of the pre-charging capacitor and the equivalent inductance $L_{eq}$ and equivalent resistance $R_{eq}$ of the bridge arms; the voltage $u_{Cflt}$ of the pre-charging capacitor is mainly affected by $L_L$, $R_L$ and $L_{dc}$, and decrease of the $u_{Cflt}$ is mainly caused by discharge of the pre-charging capacitor to the fault point; and the fault current $i_{dc2}$ is affected by the capacitance C. At time $t_2$, the $i_{dc1}$ drops to zero, and assuming $i_{dc}^2(t_2) = I_2$ and $u_{Cflt}(t_2) = U_2$.

③ At time $t_2$, the thyristor $T_0$ is turned off, energy of the pre-charging capacitor is transferred to the current limiting inductor, and the UFD$_2$ is turned off to isolate the fault line; after the fault is isolated, the MMC immediately switches from an adaptive voltage regulation control mode to a conventional control mode to restore normal operation of the DC grid.

Figure 7A:
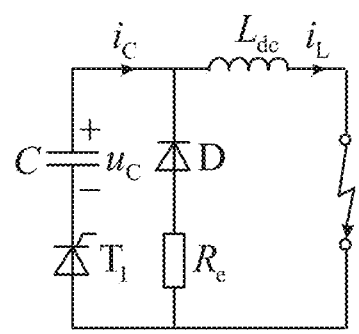
FIGS. 7a-7c show equivalent circuits in an energy dissipation stage at time $t_2$-$t_3$, $t_3$-$t_4$ and $t_4$-$t_5$, respectively.

The fault current and capacitor voltage during $t_2$-$t_3$ are calculated theoretically and the initial conditions are $u_C(t_2) = U_2$, $i_C(t_2) = i_L(t_2) = I_2$, then the following equation can be obtained from FIG. 7(a):

$$\begin{cases} u_C = L_{dc}\frac{di_L}{dt} \\ C\frac{du_C}{dt} = -i_C = -i_L \end{cases} \quad (11)$$

the solution is:

$$i_C = D_1\cos(\beta t) + D_2\sin(\beta t) \quad (12)$$

where:

$$\begin{cases} D_1 = I_2, \quad D_2 = \frac{U_{C2}}{\beta L_{dc}} \\ \beta = \frac{1}{\sqrt{L_{dc}C}} \end{cases} \quad (13)$$

① At time $t_3$, the $u_{Cflt}$ drops to zero, the $i_C$ and the $i_L$ reach the maximum values, and assuming $i_C(t_3) = i_L(t_3) = I_3$.

3) Energy Dissipation Stage

The energy dissipation stage refers to the dissipation process of residual energy of the pre-charging capacitor and the line current limiting inductor, the process together with the current limiting isolation stage forms a complete fault clearing process.

At time $t_3$, the pre-charging capacitor is reversely charged, and the $i_C$ and the $i_L$ start to decrease, in the meantime, the diode in the energy dissipation branch is turned on, the $i_D$ starts to rise from zero, energy of the current limiting inductor $L_{dc}$ is released to the energy dissipation branch, and the pre-charging capacitor is reversely charged.

Figure 7B:
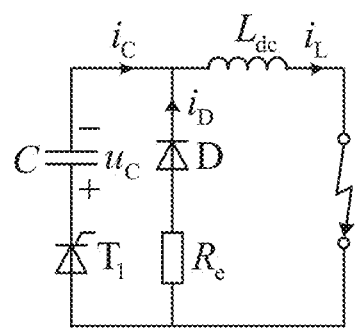

The fault current and capacitor voltage during $t_3$-$t_4$ are calculated theoretically and the initial conditions are $u_C(t_3) = 0$, $i_C(t_3) = i_L(t_3) = I_3$, $i_D(t_3) = 0$, then the following equation can be obtained from FIG. 7(b):

$$\begin{cases} u_C = L_{dc}\frac{di_L}{dt} = R_e(i_C - i_L) \\ C\frac{du_C}{dt} = -i_C \end{cases} \quad (14)$$

the solution is:

$$\begin{cases} i_L = D_1 e^{\alpha t}\cos(\beta t) + D_2 e^{\alpha t}\sin(\beta t) \\ u_C = L_{dc} e^{\alpha t}[(\alpha D_1 + \beta D_2)\cos(\beta t) + (\alpha D_2 - \beta D_1)\sin(\beta t)] \end{cases} \quad (15)$$

where:

$$\begin{cases} D_1 = I_3, \quad D_2 = -\frac{\alpha}{\beta}I_3 \\ \alpha = -\frac{1}{2RC}, \quad \beta = \frac{\sqrt{\frac{4}{L_{dc}C} - \left(\frac{1}{RC}\right)^2}}{2} \end{cases} \quad (16)$$

energy dissipated in the current limiting inductor is:

$$W_{L1} = \int_{t_4}^{t_3} \frac{1}{2} L_{dc} i_L^2(t) dt \quad (17)$$

The total energy absorbed by the pre-charging capacitor is:

$$W_C = \int_{t_4}^{t_3} \frac{1}{2}Cu_C^2(t)dt \tag{18}$$

At time $t_4$, the current $i_C$ drops to zero, and assuming $i_L(t_4)=i_D(t_4)=I_4$.

② At time $t_4$, the $i_C$ drops to zero, the thyristor $T_1$ is turned off, and the $i_D$ reaches the maximum value and starts to decrease; and residual energy of the current limiting inductor $L_{dc}$ is gradually released to the energy dissipation branch.

Figure 7C:
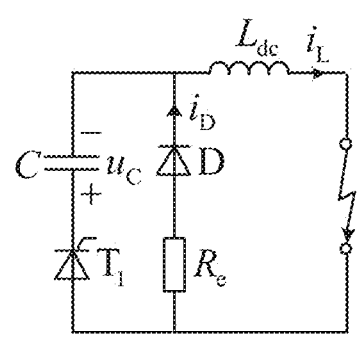

The inductor current during $t_4$-$t_5$ is calculated theoretically and the initial condition is $i_L(t_4)=i_D(t_4)=I_4$, then the following equation can be obtained from FIG. 7(c):

$$\frac{di_L}{dt} + \frac{R_e}{L_{dc}}i_L = 0 \tag{19}$$

the solution is:

$$i_L = I_4 e^{-\frac{R_e}{L}t} \tag{20}$$

energy dissipated in the current limiting inductor is:

$$W_{L2} = \int_{t_5}^{t_4} \frac{1}{2}L_{dc}i_L^2(t)dt \tag{21}$$

③ At time $t_5$, energy dissipation is over and the fault clearing is completed. The design of element parameters involved in the invention is described as follows:

1) Selection of Coefficients for Source-Side Voltage Regulation Controller

① Differential coefficient $K_1$

It can be seen from equation (5) that in the preliminary current limiting stage, the voltage regulation coefficient K is determined by change rate of fault current and differential coefficient. Because the protection device has not yet determined whether the fault is detected when the primary current limiting link works, the voltage regulation coefficient when the primary current limiting link works should be greater than or equal to the voltage regulation coefficient when the adaptive voltage regulation link works. At the moment when the source-grid coordination stage is put into operation, $K=K_{rel}$, so the minimum value of the voltage regulation coefficient in the preliminary current limiting stage is $K_{rel}$, that is, the value range of K is $[K_{rel}, 1]$ in the preliminary current limiting stage. Considering the maximum change rate of fault current $(di_{dc}/dt)_{max}$ under the most severe fault, setting calculation can be carried out by the following equation:

$$K_1 = \frac{1-K_{rel}}{(di/dt)_{max}} \tag{22}$$

In the equation, the change rate of fault current $di_{dc}/dt$ reaches the maximum at the moment of short circuit, and assuming that the DC voltage of the MMC at the moment is $U_{dc}$, the following equation can be obtained from FIG. 2:

$$\frac{di_{dc}}{dt} + \frac{R_{eq}}{L_{eq}+L_{dc}}i_{dc} = \frac{U_{dc}}{L_{eq}+L_{dc}} \tag{23}$$

According to equation (23), the maximum change rate of fault current can be solved as follows:

$$\left(\frac{di_{dc}}{dt}\right)_{max} = -\frac{R_{eq}}{L_{eq}+L_{dc}}\left(I_{dc} - \frac{U_{dc}}{R_{eq}}\right) \tag{24}$$

① Reliability coefficient $K_{rel}$

It can be seen from equation (8) that the voltage regulation coefficient K is determined by the voltage of the pre-charging capacitor and the reliability coefficient in the source-grid coordination stage. If bridge arm resistance is ignored, voltage on the bridge arm inductor is:

$$u_L = U_{Cflt} - u_p = (1-K_{rel})u_{Cflt} \tag{25}$$

Then the drop rate of current at the head end of the fault line is:

$$\frac{di_{dcl}}{dt} = -\frac{u_L}{L_{eq}} = -\frac{(1-K_{rel})u_{Cflt}}{L_{eq}} \tag{26}$$

The current at the head end of the fault line is $$i_{dcl}(t) = I_1 - \frac{1}{L_{eq}}\int_{t_1}^{t}u_L(t)dt = I_1 - \frac{1-K_{rel}}{L_{eq}}\int_{t_1}^{t}u_{Cflt}(t)dt \tag{27}$$

It can be seen from equations (26) and (27) that the drop speed and drop time of the fault current are related to the reliability coefficient $K_{rel}$ and the voltage $u_{Cflt}$ of the pre-charging capacitor, while the reliability coefficient should ensure that the fault current has a sufficient drop rate, and the drop rate of the fault current determines the time from the occurrence of the fault until the fault current is turned off.

Considering the above factors, the reliability coefficient $K_{rel}$ can be selected as 0.8 in a 500 kV DC grid.

2) Parameters for Components in the Transfer Branch

In the system fault detection stage, the thyristor $T_0$ is on, and $I_{T0\_max}$ is used to represent the maximum fault current flowing through the thyristor $T_0$. After the system detects the fault and turns off the thyristor $T_0$, the thyristor $T_0$ needs to withstand a reverse voltage before the disconnector $UFD_2$ is turned on. Assuming that the maximum reverse voltage on the thyristor $T_0$ after breaking is $U_{T0\_max}$, and $U_{T0}$ and $I_{T0}$ represent rated voltage and rated current of thyristors in the transfer branch respectively, the number of thyristors required in the transfer branch can be calculated by equation (28).

$$n_{T0} = \frac{U_{T0\_max}}{U_{T0}}\frac{I_{T0\_max}}{I_{T0}} \tag{28}$$

3) Parameters for Components in the Discharging Branch

After the fault is isolated, the line-side fault current continues to increase. It can be seen from equation (10) that the maximum fault current is closely related to the capacitance of the pre-charging capacitor, and the maximum line fault current after the fault is isolated can be adjusted by designing the capacitance parameter. Considering the maximum current allowed to pass through the line in the energy dissipation stage, the following equation can be obtained based on Formula (12):

$$I_{dc\_max} > D_1\cos(\beta t) + D_2\sin(\beta t) = \quad (29)$$
$$I_2\cos\left(\frac{1}{\sqrt{L_{dc}C}}t\right) + U_{C2}\sqrt{\frac{C}{L_{dc}}}\sin\left(\frac{1}{\sqrt{L_{dc}C}}t\right)$$

where $I_{dc\_max}$ indicates the maximum current allowed to pass through the line.

In addition, in the source-grid coordination stage, too fast voltage drop on the pre-charging capacitor will lead to excessive sub-modules to be removed, which is not good for the stability of the system, so a lower limit is to be set for the pre-charging capacitor C.

Assuming that the minimum number of sub-modules for the single-phase bridge arm during a fault is $N_{SM\_min}$, and the corresponding voltage regulation coefficient is $K_{min}$, the following equation can be obtained based on equation (8):

$$u_{Cflt} > \frac{K_{min}}{K_{rel}}U_{dc} \quad (30)$$

Therefore, the value range of capacitance is determined by equations (29) and (30).

The maximum voltage to be withstood after the thyristor $T_1$ is turned off is the maximum reverse voltage $U_{T1\_max}$ provided after the pre-charging capacitor is reversely charged. The rated voltage of the thyristor $T_1$ in the discharging branch is denoted by $U_{T1}$ and the rated current of the thyristor $T_1$ in the transfer branch is denoted by $I_{T1}$, then the number of thyristors required in the discharging branch can be calculated by equation (31).

$$n_{T1} = \frac{U_{T1\_max}}{U_{T0}}\frac{I_{T1\_max}}{I_{T1}} \quad (31)$$

4) Parameters for Components in the Flyback Energy Dissipation Branch

The maximum current of the flyback energy dissipation branch is denoted by $I_{D\_max}$, and the maximum reverse voltage withstood by the flyback diode D in the flyback energy dissipation branch is the rated DC voltage $U_{dc}$, $U_D$ and $I_D$ represent the rated voltage and rated current of the diode D in the flyback energy dissipation branch respectively, then the number of diodes required in the flyback energy dissipation branch can be calculated by equation (32).

$$n_D = \frac{U_{dc}}{U_D}\frac{I_{D\_max}}{I_D} \quad (32)$$

The size of the energy dissipation resistor determines the duration of releasing the residual energy of the $L_{dc}$ to the energy dissipation branch, $\tau_{max}$ represents the maximum time constant allowed for residual energy dissipation of the current limiting inductor, then the value range of the energy dissipation resistor $R_e$ is determined by equation (31).

$$\frac{L_{dc}}{R_e} < \tau_{max} \quad (33)$$

According to the invention, decoupling of fault isolation and fault energy dissipation is realized, with energy dissipation after isolation, fast isolation and slow energy dissipation, thereby greatly improving the speed of fault isolation, so the adaptive fault clearing scheme is applicable to some working conditions with requirement for rapidity.

The above description is only illustrative of preferred embodiments of the invention. It should be noted that those of ordinary skill in the art can make a plurality of improvements and modifications to the invention without departing from the principle of the invention, and these improvements and modifications should fall within the protection scope of the invention.

What is claimed is:

1. An adaptive fault clearing scheme for a MMC VSC-HVDC grid based on source-grid coordination, wherein the MMC VSC-HVDC grid comprises two source-side converter stations MMC1 and MMC3, two grid-side converter stations MMC2 and MMC4, wherein converters of the four converter stations are connected in a square shape by double-circuit DC overhead lines, and each converter station is equipped with two converters; a grid-side circuit breaker is disposed at each end of each DC line connected with the converters to coordinate with a source-side control strategy when a fault occurs to the DC line so as to isolate the fault together; the grid-side circuit breaker topology comprises:

a steady-state low-loss branch, comprising a disconnector $UFD_1$, an IGBT device and a disconnector $UFD_2$ sequentially connected in series;

a transfer branch, comprising a thyristor $T_0$ disposed in parallel, wherein one end of the thyristor $T_0$ is connected with a front end of the disconnector $UFD_1$, and other end is connected to a line between the IGBT device and the disconnector $UFD_2$;

a charging circuit, disposed at a rear ends of the steady-state low-loss branch and the transfer branch and formed by sequentially connecting a pre-charging capacitor C, a switch RCB, a charging resistor $R_C$ and a charging inductor $L_C$ in series; wherein one end of the pre-charging capacitor C is connected with a rear end of the disconnector $UFD_2$, and one end of the charging inductor $L_C$ is grounded;

a discharging branch, comprising a thyristor $T_1$ connected in parallel with the charging circuit, wherein one end of the thyristor $T_1$ is connected to a ground terminal of the charging inductor $L_C$, and other end is connected to a line between the pre-charging capacitor C and the switch RCB; and a flyback energy dissipation branch, connected in parallel with the charging circuit and disposed at a rear ends of the charging circuit and the discharging circuit, and comprising a flyback diode D and an energy dissipation resistor $R_e$ connected in series; wherein other end of the energy dissipation resistor $R_e$ is grounded, and other end of the flyback diode D is connected with the rear end of the disconnector $UFD_2$ and a front end of a current limiting inductor $L_{dc}$ disposed at a terminal;

wherein the source-side control strategy is realized by a voltage regulation controller; when a system runs stably, the voltage regulation controller does not actuate, and an output voltage regulation coefficient K is kept at 1; after a fault occurs, the voltage regulation controller is started, and the output voltage regulation coefficient K decreases within the range of [0,1], so that voltage at outlets of the converters drops accordingly, and coordinates with voltage of the pre-charging capacitor of the grid-side circuit breaker topology to realize fault isolation based on the source-grid coordination; wherein the voltage regulation controller gives corresponding voltage regulation coefficients Kat different stages after the fault occurs, and the voltage regulation controller comprises a preliminary current limiting link and an adaptive voltage regulation link; the preliminary current limiting link is put into operation until the system detects the fault, while the adaptive voltage regulation link is put into operation only after the system detects the fault; after the fault occurs, the preliminary current limiting link is started immediately to preliminarily limit the development of fault current; after monitoring the fault, a DC grid protection system switches to the adaptive voltage regulation link, and adaptively coordinates with voltage of the grid-side pre-charging capacitor to isolate the fault together.

2. The adaptive fault clearing scheme for the MMC VSC-HVDC grid based on the source-grid coordination according to claim 1, wherein the pre-charging capacitor C needs to be charged during normal operation of the DC grid, so that the pre-charging capacitor C has a rated DC voltage after charging to lower an output voltage of the voltage regulation controller by adjusting a number of sub-modules for the converters in a fault isolation stage, and coordinate with the voltage of the pre-charging capacitor C to decrease and turn off the fault current.

3. The adaptive fault clearing scheme for the MMC VSC-HVDC grid based on the source-grid coordination according to claim 1, wherein a voltage attenuation speed of the pre-charging capacitor C is different at different transition resistance when a fault occurs to the DC grid, and the voltage regulation coefficient K is matched with different transition resistance to adaptively adjust a number of removed sub-modules to cope with both metallic short-circuit faults and high-resistance short-circuit faults.

4. The adaptive fault clearing scheme for the MMC VSC-HVDC grid based on the source-grid coordination according to claim 3, wherein when the fault occurs to the DC grid, fault clearing is achieved by the following steps: at time $t_0$, the fault occurs, and the fault current flows from the converter stations to a fault point through the steady-state low-loss branch, in the meantime, the preliminary current limiting link is started immediately to preliminarily limit the rise of the fault current, and an instruction is given to block the IGBT device and turn on the thyristor $T_0$ to allow the fault current on the steady-state low-loss branch to be quickly transferred to the transfer branch; and the disconnector $UFD_1$ is turned off when a current flowing through the disconnector $UFD_1$ drops to 0;

at time $t_1$, the fault is detected, the disconnector $UFD_1$ is turned off, and the thyristor $T_1$ is turned on, the pre-charging capacitor C is connected to the discharge branch, and a number of control sub-modules of a source-side converters is reduced, so that the sum of voltage of sub-modules for upper and lower bridge arms of the converters is less than a voltage $u_{Cft}$ of the pre-charging capacitor; in the process, the fault current in the transfer branch drops to zero at a large rate to turn off the thyristor $T_0$, and the fault point is isolated after the thyristor $T_0$ is turned off;

at time $t_2$, the thyristor $T_0$ is turned off, energy of the pre-charging capacitor C is transferred to the current limiting inductor $L_{dc}$, and the disconnector $UFD_2$ is turned off to isolate a fault line; after the fault is isolated, a MMC switches from an adaptive voltage regulation control mode to a conventional control mode to restore normal operation of the DC grid;

at time $t_3$, the pre-charging capacitor C is reversely charged, and a current $i_C$ of the charging circuit and a current $i_L$ of the current limiting inductor $L_{dc}$ start to decrease, in the meantime, the diode D in the flyback energy dissipation branch is turned on, a current $i_D$ of the diode D starts to rise from zero, energy of the current limiting inductor $L_{dc}$ is released to the flyback energy dissipation branch, and the pre-charging capacitor C is reversely charged;

at time $t_4$, the current $i_C$ of the charging circuit drops to zero, the thyristor $T_1$ is turned off, and the current $i_D$ of the diode D reaches a maximum value and starts to decrease; and residual energy of the current limiting inductor $L_{dc}$ is gradually released to the flyback energy dissipation branch; and at time $t_5$, energy dissipation is over and the fault clearing is completed.

* * * * *